United States Patent [19]

Westervelt

[11] 3,960,415
[45] June 1, 1976

[54] BEARING STRUCTURE WITH IMPROVED SEAL ARRANGEMENT

[75] Inventor: Ralph Westervelt, Pekin, Ill.

[73] Assignee: Caterpillar Tractor Co., Peoria, Ill.

[22] Filed: Feb. 7, 1975

[21] Appl. No.: 548,110

[52] U.S. Cl.............................. 308/36.1; 308/187
[51] Int. Cl.² ......................................... F16C 1/24
[58] Field of Search................ 308/36.1, 36.3, 187, 308/237 A, 237 R

[56] References Cited
UNITED STATES PATENTS

| | | | |
|---|---|---|---|
| 1,930,586 | 10/1933 | Crow | 308/36.1 |
| 2,657,943 | 11/1953 | Booser et al. | 277/135 |
| 2,799,532 | 7/1957 | Smart | 277/135 |
| 3,190,702 | 6/1965 | Flick | 308/36.1 |

*Primary Examiner*—M. H. Wood, Jr.
*Assistant Examiner*—Gene A. Church
*Attorney, Agent, or Firm*—Phillips, Moore, Weissenberger Lempio & Strabala

[57] ABSTRACT

An improved seal arrangement for a drive mechanism of the type having a rotating member and a radially spaced stationary member with a bearing mounting the rotating member on the stationary member, as in a clutch assembly for an air conditioning compressor, is disclosed. The seal arrangement includes a first seal support member carried by the rotating member on one side of the bearing, a second seal support member carried by the stationary member on the other side of the bearing, and an annular fluoroplastic-coated felt seal member. The first and second seal support members are located and dimensioned to overlap each other to provide an annular volume therebetween and the annular felt seal member is dimensioned and located to fill at least a portion of such annular volume, one side of the felt seal member being secured to one of the support members and the other side of the felt seal member being in rotary sealing engagement with the other seal support member. An embodiment of the invention in which the annular volume extends radially outwardly of the felt seal member to provide a slinging action to further prevent material detrimental to the bearing from entering through the seal is described.

10 Claims, 3 Drawing Figures

BEARING STRUCTURE WITH IMPROVED SEAL ARRANGEMENT

BACKGROUND OF THE INVENTION

Certain mechanisms, such as refrigerant compressors or the like, employ drive units adapted for intermittent activation depending on the requirements of the mechanism. To control activation, these mechanisms usually employ a clutch plate secured to a hub mounted on the mechanism's drive shaft which may be engaged with a continuously driven rotating member by activation of an electromagnet mounted on the mechanism housing. To permit continuous driving of the rotating member and for compactness, the rotating member is positioned coaxially with the drive shaft on a spindle formed by an extended portion of the mechanism housing. A roller bearing is disposed between the spindle and the rotating member and carries the rotating member on the spindle. The electromagnet, rotating member, and clutch plate are juxtapositioned so that when the electromagnet is energized, the rotating member is magnetized, attracting the clutch plate which drives the mechanism's drive shaft.

In vehicular installations, these mechanisms are often required to operate in contaminated environments laden with dust, dirt and moisture, and are subjected to high temperatures, all of which are detrimental to bearing and seal life. It is also believed that magnetization of the bearing, when the mechanism is being driven, attracts certain foreign particles. Although the bearings used to mount the rotating member on the spindle are conventionally of the sealed type, having lip-type seals mounted between the inner and outer races on both sides of the bearing, the bearing faces are exposed to several paths or passages which allow contaminants to pack against the bearing faces and lip-type seals. Over a period of time, the environmental factors and forces within the mechanism cause the contaminants to lift the bearing seals from their seats permitting the entrance of foreign matter into the bearing. This results in failure of the bearing and the need to frequently service the drive unit.

U.S. Pat. No. 3,743,068 teaches a dual seal arrangement including a seal structure at the free end of the stationary spindle comprising a seal support and bearing retainer cup carried by the rotating member and having a felt seal bonded thereto and held in sealing relationship with the free end of the stationary spindle. Due to the location of such seal structure at the free end of the spindle, it receives the greatest exposure to contaminated environments and it has been found that dust, dirt and moisture tend to migrate through the sealing relationship between the parts, although at a greatly reduced rate, to eventually produce a detrimental effect on the bearing.

It is an object of this invention to reduce the migration of contaminants through the seal arrangement while at the same time imposing only minimal resistance on the rotational components of the mechanism and retaining lubricant within the bearing.

SUMMARY OF THE INVENTION

According to this invention, a seal structure is provided in a drive mechanism comprising a spindle rigidly mounted at one end and a rotating member mounted for rotation about the longitudinal axis of the spindle by a bearing means which seal structure comprises a first annular seal support member mounted at the free end of the spindle and extending radially outward thereof, a second annular seal support member mounted at the free end of the spindle and extending radially outward thereof, a second annular seal support member mounted on the rotating member and extending radially inward thereof into overlapping relation with the first seal support member so that an annular peripheral surface of the first seal support member is disposed in opposition to an annular peripheral surface of the second seal support member to define an annular volume therebetween and an annular seal member positioned within the annular volume, such annular seal member extending between the opposed surfaces of the first and second seal support members and being bonded to one of such opposed surfaces and in rotary sealing engagement with the other of such opposed surfaces.

BRIEF DESCRIPTION OF THE DRAWING

The foregoing and other objects and features of this invention will be more readily apparent from a reading of the following detailed description of preferred embodiments thereof in conjunction with the accompanying drawing wherein.

DESCRIPTION OF PREFERRED EMBODIMENTS

Figure 1:
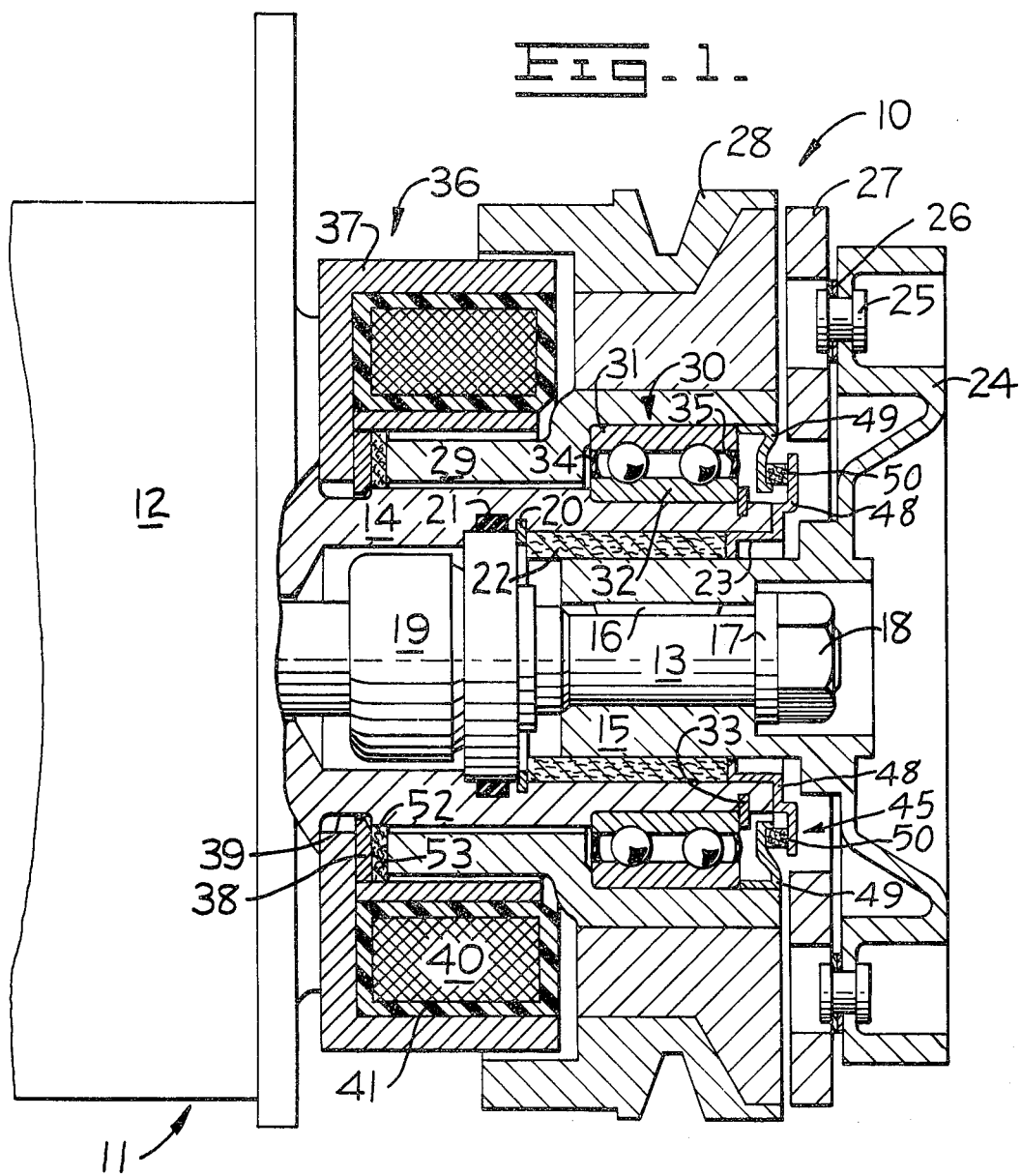
FIG. 1 is a longitudinal vertical section taken centrally through a drive mechanism incorporating the improved seal arrangement of the present invention.

Referring to FIG. 1, a drive mechanism embodying the present invention is shown generally at 10 in association with the compressor, a fragment of which is shown generally at 11. The compressor includes a housing 12 and a drive shaft 13. The housing 12 has a cylindrical extension forming a hollow spindle 14 for mounting the drive mechanism 10 thereon.

A shaft assembly comprises shaft 13 extending through the central portion of the spindle and a hub 15 secured thereto in driving relationship by a key 16, a washer 17 and a nut 18. The compressor mechanism is sealed with a conventional face type seal 19 held in place by a ring 20 and sealed on its outer periphery with an O-ring 21. Further sealing between the shaft 13 and the spindle 14 is provided by a felt seal 22 secured within the spindle by a retaining ring 23.

Hub 15 has a radially extending flange 24 mounting a plurality of rivets 25 for securing a pair of leaf springs 26 to the flange 24. The rivets 25 also mount a clutch plate 27 on the flange in facing engagement with the leaf springs 26. A rotating member comprising a pulley 28 adjacent to and in spaced axial relationship with the clutch plate 27, and a cylindrical member 29 surrounds spindle 14.

A roller bearing assembly 30, rotatably mounting the rotating member on spindle 14, has an outer race 31 secured within the cylindrical member 29. An inner race 32 is retained upon the spindle by a retaining ring 33. The bearing has a pair of seals 34 and 35 on opposite sides thereof to retain lubricant within the bearing and to inhibit foreign matter from entering therein.

An electromagnet 36 has a housing 37 secured to compressor housing 12 by a snap ring 38 engaging a groove 39 in the spindle. The electromagnet includes a coil 40 surrounded by insulation 41.

When the compressor is to be driven, the coil 40 is energized by electrical current from a source, not shown. Magnetic lines of force pass through the pulley 14 which attracts clutch plate 27. The clutch plate engages the adjacent face of the pulley, completing the drive connection between the pulley and the hub to drive the shaft and the compressor mechanism connected therewith.

To prevent the ingress of foreign matter into the space between the spindle 14 and the cylindrical member 29 of the pulley assembly, where it can contact the seals of the bearing 30, a dual seal arrangement is provided to seal the space on both sides of the bearing 30. Thus, on the inside of the bearing 30 adjacent the fixed end of the stationary spindle 14 where it joins the housing 12, a stationary seal 52 abuts snap ring 38 and an end face 53 of the cylindrical member 29 and is further disposed in sealing relationship with the exterior surface of the spindle 14. It will be understood that this seal 52 is well protected from the surrounding environment by the electromagnet housing and snap ring 38. Thus, a relatively small amount of contamination reaches the seal 52 and the migration of such contamination through the seal 52 is small even though such seal is in direct contact with a rotating surface at the end of the cylindrical member 29.

At the free end of the spindle 14 a more effective seal arrangement is required due to the exposure of such seal arrangement to dust, dirt and moisture which tends to be carried into the vicinity of the seal arrangement both by the relative rotation of the pulley 28 and clutch means 27 with respect to each other and by the electromagnetic forces as discussed hereinabove.

According to this invention, an improved seal structure is provided at the free end of the spindle which provides a more effective barrier to the entry of contaminants into the vicinity of the bearing 30.

Referring to FIG. 1, a first embodiment of the improved seal structure according to the teaching of this invention is shown at 45. The seal structure 45 comprises a first annular seal support member 48 mounted at the free end of the spindle 14 and extending radially outward thereof. As shown in FIG. 1, the first annular seal support member is conveniently formed as an outwardly extending flange on the retaining ring 23 which is press fit within the spindle 14 at the free end thereof and which also serves to secure the felt seal 22 within the spindle.

A second annular seal support member 49 is mounted on the rotating member or pulley 28 assembly and extends radially inward thereof into overlapping relation with the first annular seal support member 48 so that an annular volume is formed between opposed peripheral surfaces of the seal support members 48 and 49. For example, the second annular seal support member 49 may comprise a bearing retainer cup press fit into the cylindrical member 29 of the pulley assembly to secure the outer race 31 of the bearing assembly with the inwardly extending flange thereof providing the second seal support member 49.

An annular seal member 50 is positioned within the annular volume between the overlapping opposed surfaces of the seal support members 48 and 49. The seal member 50 comprises a felt ring having one face bonded to one of the seal support members and the other face coated with fluoroplastic or polytetrafluoroethylene to reduce sliding friction between such face and the surface of the seal support member in contact therewith. In the embodiment of the invention shown in FIG. 1, the felt ring 50 is bonded to the annular seal support member 49 as by means of an adhesive and is in sliding compressive contact with the overlapping surface of the annular seal support member 48.

It will be seen that the annular seal support member 48 will be stationary at all times in operation because it is mounted on the stationary spindle 14. The annular seal support member 49 and seal member 50 will rotate with the pulley 28 and cylindrical member 29 of the pulley assembly. Thus, any contaminants present in the vicinity of the seal member 50 will be subjected to centrifugal forces which urge them to move outwardly of the seal member 50 and thus inhibit their migration through the rotary seal between the seal member 50 and the adjacent surface of the annular seal support member 48.

Figure 2:
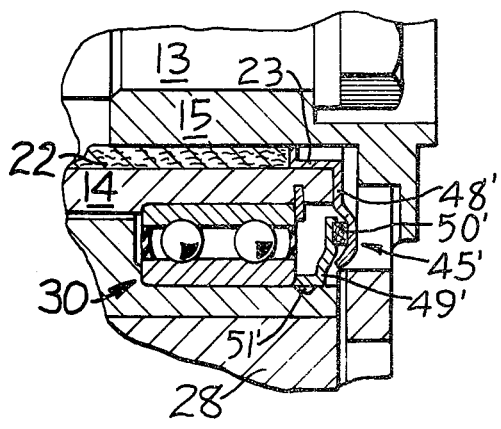
FIG. 2 is a fragmentary sectional view of another drive mechanism showing an alternative embodiment of the present invention.

Referring to FIG. 2, an alternative embodiment of the seal structure according to this invention is shown at 45'. According to this embodiment, the seal member 50 is located in a radially inward portion of the annular volume defined between the overlapping surfaces of the seal support members 48' and 49'. The outer periphery of the seal support member 48' is formed to cause it to approach the adjacent overlapping surface of the seal support member 49' to provide a spacing therebetween which decreases in a radially outward direction. This configuration provides a slinging action which further contributes to the urging of contaminants to move radially outward away from the seal member 50. Thus, the restricted opening to the volume defined by the opposed surfaces of the seal support members 48' and 49' at the outer periphery of the seal support member 48' not only helps to prevent the entrance of contaminants but provides a Venturi-like action to enhance the movement of contaminants radially outward of the seal member 50.

As shown in FIG. 2, the seal support member 49' is provided with a band 51 which snaps into a melting groove provided in the inner surface of the cylindrical member 29 to augment the retaining function performed thereby with respect to the bearing assembly 30. However, the seal structure according to this invention may also be adapted to other assembly techniques.

Figure 3:
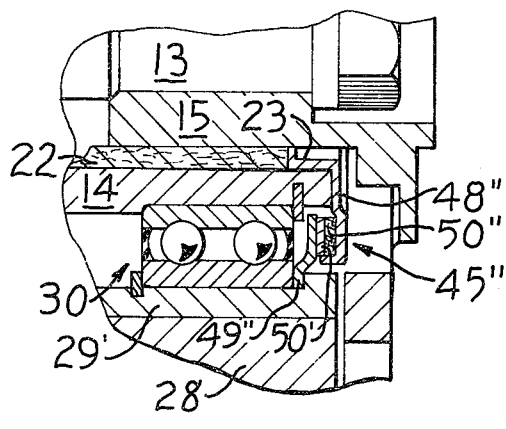
FIG. 3 is a fragmentary sectional view of yet another drive mechanism showing a further alternative embodiment of the present invention.

Thus, referring to FIG. 3, a further alternative embodiment of the seal structure of this invention is shown at 45'' which is adapted for different assembly techniques from that used in connection with the seal structures of FIGS. 1 and 2. Thus, the pulley 28 assembly is provided with a cylindrical member 29' having a counterbore therein providing a shoulder adjacent the free end of the spindle 14. The seal support member 49'' then takes the form of a simple annulus held against the shoulder by the outer race of the bearing assembly 30 which may be secured in place by a snap ring and groove arrangement similar to that used for securing the inner race of the bearing assembly 30, for example.

In addition, the alternative embodiment shown in FIG. 3 includes a pair of annular seal members 50' and 50'' each bonded to a different one of the seal support members 48'' and 49''. The seal members 50' and 50'' abut each other to provide a rotating seal and the outer periphery of the seal support member 48'' is provided with a lip which extends across the plane of abutment between the seal members 50' and 50''. Thus, it will be seen that a rotary peripheral seal as well as a planar rotary seal will be provided in the seal structure 45''.

It will be understood that the seal members 50' and 50'' as well as the seal member 52 may all comprise felt rings coated with fluoroplastic or other appropriate low friction materials, as mentioned in connection with seal member 50. Such coating of low friction material is preferably restricted to areas of actual rotating contact.

Referring again to FIG. 1, it will be understood that in operation, the pulley 28 is constantly driven in a conventional manner by a V-belt, not shown, causing rotation of the pulley 28 on the bearing assembly 30 about the spindle 14. This causes cylindrical member 29, seal support member 49 and seal member 50 to rotate about the hub 15. When electromagnet 36 is energized to magnetize the pulley 28, clutch plate 27 is drawn to the pulley 28 which in turn drives flange 24, hub 15 and shaft 13.

Upon driving of the hub, the seal support member 49 and seal member 50 remain stationary relative to the outer periphery of the hub, while the surface of the seal member 50 slidably engages the second surface of the seal support member 48. Thus, foreign matter in the form of dirt or dust particles or other foreign matter are urged to move outwardly by centrifugal force away from the seal member 50 and ingress of such foreign matter through the rotating contact between the seal member 50 and the seal support member 48 towards the felt seal 22 and face seal 35 is inhibited. During such driving, the seal member 52 is in continuous engagement with the end face 53 of cylindrical member 29 to provide a barrier against entrance of foreign matter towards the face seal 34 and bearing assembly 30.

It is thus readily apparent that the present invention provides an improved seal structure whereby the ingress of foreign matter to the roller bearing structure is inhibited resulting in a further increase in bearing life over that provided by seal structures of the prior art.

It is believed that those skilled in the art will adapt the seal structure of this invention for use in various other bearing structures. Thus, it is believed that various obvious modifications will be made in the specific embodiments of this invention shown in the drawing and described in the foregoing specification to suit the needs of various types of equipment.

What is claimed is:

1. In a drive mechanism including a spindle rigidly mounted at one end and a rotating member mounted for rotation about the longitudinal axis of said spindle by a bearing means; a seal comprising:
    a. a first annular seal support member mounted at the free end of said spindle and extending radially outward thereof on the opposite side of said bearing means from said one end of said spindle;
    b. a second annular seal support member mounted on said rotating member and extending radially inward thereof into radially overlapping relation with said first seal support member whereby an annular peripheral surface portion only of said first seal support member is disposed in opposition to an annular peripheral surface portion only of said second seal support member to define an annular volume therebetween; and
    c. an annular seal member positioned within said annular volume, said annular seal member extending between said opposed surfaces of said first and second seal support members and being bonded to one of said opposed surfaces and in rotary sealing engagement with the other of said opposed surfaces.

2. A seal structure in a drive mechanism as claimed in claim 1 wherein said seal member has a volume smaller than said annular volume and fills a radially inward portion of said annular volume.

3. A seal structure in a drive mechanism as claimed in claim 1 wherein said seal member is bonded to said second annular seal support member and in rotary sealing engagement with said first annular seal support member.

4. A seal structure is in a drive mechanism as claimed in claim 2 wherein the peripheral portion of the surface of said first annular seal support member radially outward of said seal member approaches the opposed surface of said second annular seal support member.

5. A seal structure in a drive mechanism as claimed in claim 1 wherein said spindle is hollow and said first annular seal support member comprises an outwardly flanged cup press fit into the free end of said spindle.

6. A seal structure in a driving mechanism as claimed in claim 5 wherein said flange of said outwardly flanged cup abuts substantially the entire end surface of said free end of said spindle.

7. In a drive mechanism including a spindle rigidly mounted at one end and a rotating member mounted for rotation about the longitudinal axis of said spindle by a bearing means; a seal comprising:
    a. a first annular seal support member mounted at the free end of said spindle and extending radially outward thereof on the opposite side of said bearing means from said one end of said spindle;
    b. a second annular seal support member mounted on said rotating member and extending radially inward thereof into radially overlapping relation with said first seal support member whereby an annular peripheral surface portion only of said first seal support member is disposed in opposition to an annular peripheral surface portion only of said second seal support member to define an annular volume therebetween; and
    c. an annular seal means positioned within said annular volume and extending between said opposed surfaces of said first and second seal support members, said seal means comprising a pair of coaxially aligned rings of resilient material each having one face bonded to the opposed surface of a different one of said first and second annular seal support members with the other faces of said rings in compressive rotary seal engagement with each other, said other faces of said rings being coated with a fluoroplastic material having a low coefficient of friction.

8. A seal structure in a drive mechanism as claimed in claim 7 wherein said first annular seal support member has an outer diameter substantially equal to the other diameter of said rings and an axially extending flange formed on the outer periphery thereof having a length greater than the thickness of one of said pair of rings but less than twice said thickness, whereby the outer peripheries of said rings are in contact with the inner surface of said axially extending flange.

9. A seal structure in a drive mechanism as claimed in claim 4 wherein the spacing between the said opposed surfaces of said first and second annular seal support member decreases from a maximum at the outer periphery of said seal member to a minimum at the periphery of said first annular seal support member.

10. A seal structure in a drive mechanism as claimed in claim 5 wherein said second annular seal support member comprises an inwardly flanged cup press fit in the end of said rotating member at the end thereof adjacent the free end of said spindle.

* * * * *